United States Patent [19]

Eisenlohr et al.

[11] Patent Number: 4,515,604
[45] Date of Patent: May 7, 1985

[54] PROCESS OF PRODUCING A SYNTHESIS GAS WHICH HAS A LOW INERT GAS CONTENT

[75] Inventors: Karl-Heinz Eisenlohr, Dreieich; Hans Gaensslen; Manfred Kriebel, both of Frankfurt; Heiner Tanz, Dreieich, all of Fed. Rep. of Germany

[73] Assignee: Metallgesellschaft Aktiengesellschaft, Frankfurt am Main, Fed. Rep. of Germany

[21] Appl. No.: 488,472

[22] Filed: Apr. 25, 1983

[30] Foreign Application Priority Data

May 8, 1982 [DE] Fed. Rep. of Germany ....... 3217366

[51] Int. Cl.³ .............................. C10J 3/00; C10K 1/00
[52] U.S. Cl. .................................... 48/197 R; 48/210; 48/211; 252/373
[58] Field of Search ...................... 48/197 R, 210, 211, 48/215; 55/75; 252/373; 62/17, 31, 18, 32, 34, 20

[56] References Cited

U.S. PATENT DOCUMENTS

| | | | |
|---|---|---|---|
| 4,094,650 | 6/1978 | Koh et al. ........................... | 48/197 R |
| 4,211,669 | 7/1980 | Eakman et al. ...................... | 252/373 |
| 4,217,759 | 8/1980 | Shenoy ............................ | 252/373 X |
| 4,338,107 | 7/1982 | Swallow ............................ | 62/17 |

Primary Examiner—Jay H. Woo
Assistant Examiner—Joye L. Woodard
Attorney, Agent, or Firm—Sprung Horn Kramer & Woods

[57] ABSTRACT

In a process of producing a synthesis gas which has a low inert gas content and is intended for the synthesis of alcohols, particularly of methanol, and of hydrocarbons, and which is produced from coal or heavy hydrocarbons, by a gasification under pressure with oxygen and steam, whereafter the raw gas is cooled, the impurities are removed by a scrubbing with methanol, and the methanol is removed by means of molecular sieves from the cold pure gas. The pure gas is then cooled further and partly liquefied, the remaining gas is further cooled by a pressure relief and methane is distilled from the liquid part with simultaneous recovery of the synthesis gas, which consists of hydrogen and carbon monoxide and has a low methane content. All or part of the methane is compressed and is subsequently reacted with steam and oxygen to produce carbon monoxide and hydrogen. The produced gas is admixed to the synthesis gas or to the partly purified raw gas.

1 Claim, 1 Drawing Figure

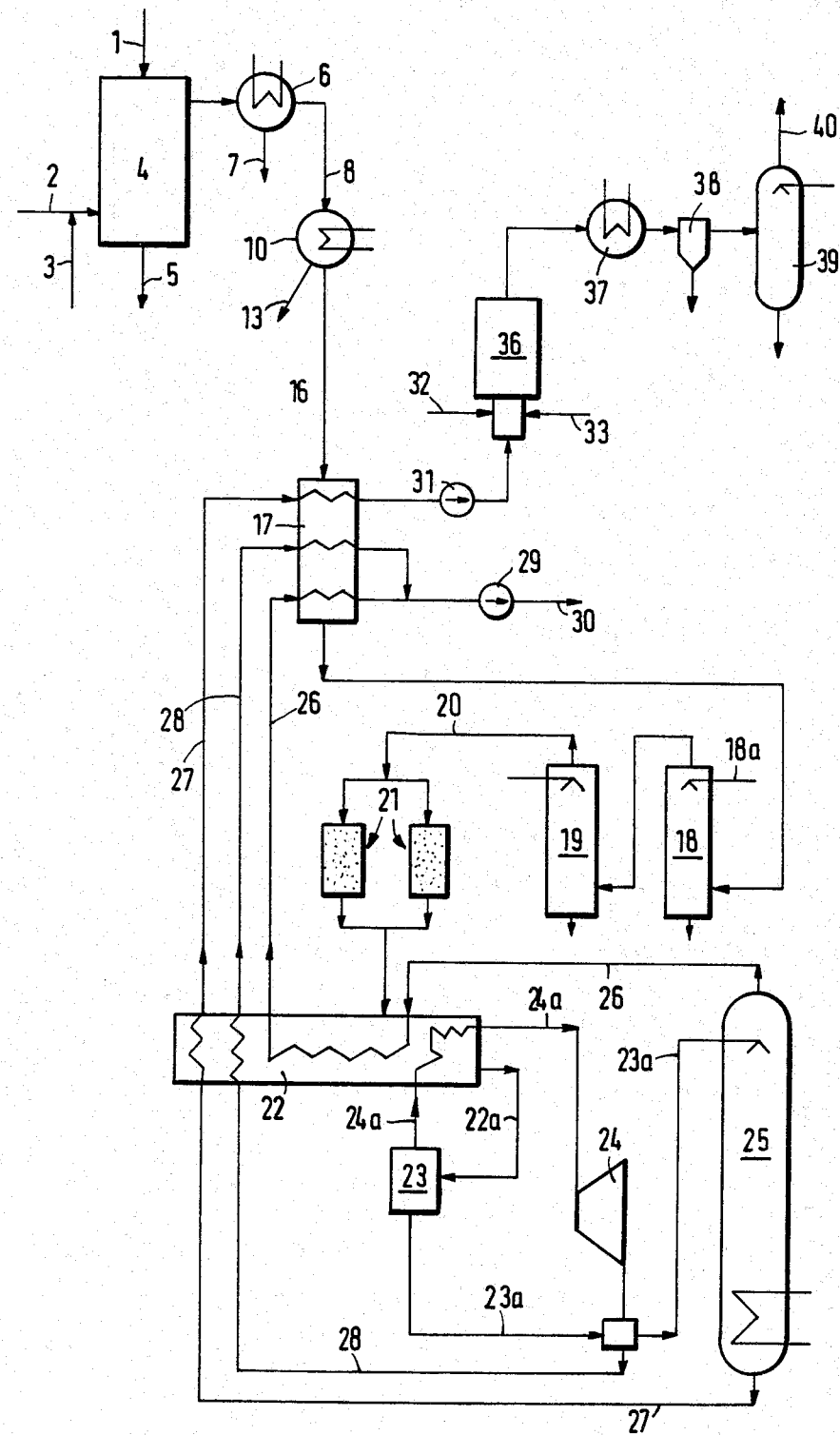

PROCESS OF PRODUCING A SYNTHESIS GAS WHICH HAS A LOW INERT GAS CONTENT

BACKGROUND OF THE INVENTION

1. Field of Invention

This invention relates to a process of producing a synthesis gas which has a low inert gas content and is intended for the synthesis of alcohols, particularly of methanol, and of hydrocarbons, and which is produced from coal or heavy hydrocarbons by a gasification under pressure with oxygen and steam followed by a cooling of the raw gas, removal of the impurities, and separation and cracking of methane with oxygen and steam.

2. Discussion of Prior Art

It is known to gasify coal with oxygen and steam under pressure and at elevated temperatures. In such processes the raw gas, which consists substantially of $H_2$, $CO$, $CO_2$ and $CH_4$, is cooled and is scrubbed with methanol in order to remove impurities, particularly sulfur compounds, such as $H_2S$ and $COS$, and $CO_2$. Because the capacity of the methanol to absorb the impurities strongly increases as the temperature is lowered, the scrubbing with methanol is effected at very low temperatures. The resulting pure gas can be treated, e.g., by the Fischer-Tropsch synthesis, to produce hydrocarbons, alcohols and motor fuels. The sulfur compounds which are recovered by the regeneration of the methanol can be reacted to produce elementary sulfur, e.g., by the Claus process (Linde, Berichte aus Technik und Wissenschaft, 45 (1979), pages 9 to 17). Alternatively, the scrubbing with methanol may be combined with a scrubbing with liquid $N_2$ to remove $CO$, $CH_4$ and Ar and to produce ammonia (Linde I, Berichte zur Technik und Wissenschaft, 45 (1979), pages 3 to 8).

A disadvantage of those known processes resides in that methane constitutes an inert gas, which affects the synthesis. For instance, a higher pressure is required for the reaction of the reactants because the methane acts as a diluent. This reduces the efficiency of the synthesis. On the other hand, residual gases containing methane and the unreacted constituents of the synthesis gases become available at a high rate. For these reasons it is necessary for an improvement of the efficiency of the synthesis, e.g., in the process described in Linde, Berichte aus Technik und Wissenschaft, 45 (1979), pages 9 et seq., to treat said residual gas in an expensive process for a recovery of residual synthesis gas.

It is an object of the invention to avoid these disadvantages and to provide a pure gas which contains $H_2$ and $CO$ and has a very low inert gas content and can be used for a synthesis of alcohols, particularly of methanol, and of hydrocarbons. It is an object of the invention to provide a simple and economical process for production of such a pure gas.

SUMMARY OF INVENTION

This object is accomplished according to the invention in that the raw gas is cooled to about 20° to 50° C., the impurities are removed by a multistage scrubbing with methanol at temperatures below −25° C., methanol is removed from the cold pure gas by molecular sieves, the cold gas is liquified in part, the remaining gas is pressure-relieved to effect a further cooling, the methane is removed from the liquid part by distillation with simultaneous recovery of the synthesis gas, which consists of hydrogen and carbon monoxide and has a very low methane content, and the synthesis gas and the methane are heated with heat extracted from the pure gas and the raw gas.

It is suitable to compress all or part of the methane and then to react the methane with steam and oxygen to form carbon monoxide and hydrogen. The gas produced may be admixed to the synthesis gas or to the raw gas which has been partially purified by the scrubbing with methanol.

The advantages afforded by the invention reside particularly in that a simple and economical process is provided for the production of a gas which contains $H_2$ and $CO$ and can be used for the synthesis of alcohols, particularly methanol, and of hydrocarbons. The synthesis gas is of very high purity and is free of $CO_2$ and $CH_4$ and contains virtually no other inert constituents.

Owing to the higher purity of the synthesis gas, the yields of the syntheses can be improved, the inert contents can be reduced and the residual gas can be processed in a much simpler manner. For instance, the quantity of residual gas amounting to, e.g., about 50% by volume can be reduced to about 10% by volume by the novel process. The residual gas can be processed at ambient temperature, e.g., it can be scrubbed with oil, so that there is no need for circulating refrigerating systems which require large energy for the separation, of inert constituents and the synthesis gas at low temperatures.

Parts of the process are known. For instance, the gasification of granular coal in a fixed bed under a pressure of 5 to 150 bars has been described in Ullmanns Enzyklopädie der technischen Chemie, 4th edition (1977), volume 14, pages 383 to 386. Details of that known gasifying process can also be taken from U.S. Pat. No. 3,540,867 and U.S. Pat. No 3,854,895. The known Rectisol process can be used to scrub the gas with metanol at low temperatures in the range of −20° to −80° C. The cracking of methane with oxygen and steam, with or without a nickel catalyst, is also known in the art (German No. 21 41 875 and corresponding U.S. Pat. No. 3,963,642).

BRIEF DESCRIPTION OF DRAWING

Preferred further features of the process will be explained with reference to the drawing.

DESCRIPTION OF SPECIFIC EMBODIMENT

Granular coal is supplied in duct 1 to a reactor 4 and is gasified therein in a fixed bed under super-atmospheric pressure. The oxygen required for the gasification is supplied through duct 2 and steam is supplied through duct 3. Ash is withdrawn from the reactor 4 through duct 5. The raw gas produced by the gasification is cooled in several stages. That cooling is only diagrammatically indicated in the drawing. A condensate becomes available in the indirect cooler 6 and is withdrawn in conduit 7. Another indirect cooling is effected in the heat exchanger 10, which is fed via line 8 which is also connected to a condensate drain 13. Cooled gas with a pressure of 10-100 bar produced by the gasification of coal flows in duct 16 through a heat exchanger 17 and is cooled therein to a temperature in the range of 20° to 50° C.

In the absorber 18 the gas is treated with liquid methanol from conduit 18a to remove $H_2S$ and some $CO_2$ from the gas, from which the remaining $CO_2$ is subsequently removed in the absorber 19. In both absorbers the gas flows upwardly in a countercurrent to the methanol and in direct contact therewith. The gas cleaning absorber 19 in line 20 has a temperature in the range of −30° to −80° C. and a pressure of 10 to 100 bar.

The gas flows through duct 20 to a molecular sieve plant 21, in which entrained methanol is separated. In plant 21 commercially available alumino-silicate molecular sieve materials with pore sizes of 4–5 Angstrom may be used. The gas subsequently enters the heat exchanger 22, where the constituents of the gas begin to liquefy. Gas and liquid with temperatures of −150° to −195° C. flow through conduit 22a to the separator 23, in which liquid is separated from the gas. The separated liquid is fed through conduit 23a to the separating column 25. The gas is conducted through the heat exchanger 22 in duct 24a and is subsequently cooled by a pressure relief in a turbine 24. The gas in line 24a has a pressure of 20 to 50 bar and the gas leaving turbine 24 in line 28 has a pressure of 5 to 15 bar. The very cold gas in line 28, consisting of the pure synthesis gas components CO and $H_2$, is conducted under the residual pressure through the heat exchangers 22 and 17 and is heated therein.

Separation in column 25 is effected by normal distillation at a pressure in the range of 1 to 10 bar and temperatures in the upper part of −160 to −195 and bottom temperatures of −120° to −170° C. Liquid methane is drained in conduit 27 from the separating column 25 and is evaporated in the heat exchanger 22 and heated further in the heat exchanger 17. The overhead product resulting from the distillation in column 25 consists of pure synthesis gas ($CO+H_2$) and is withdrawn through duct 26 and heated in heat exchangers 22 and 17. The compressor 29 withdraws the synthesis gas together with the synthesis gas flowing in duct 28 and delivers the synthesis gases to duct 30 for further use.

The methane flowing in duct 27 is delivered by the compressor 31 to a partial oxidation reactor 36, which is supplied with preheated oxygen through duct 32 and with steam through duct 33. The product gas formed in reactor 36 consists mainly of carbon monoxide and hydrogen and is cooled in the waste heat boiler 37. Condensate is removed in the separator 38. This is succeeded by a scrubber 39, in which a major part of the $CO_2$ is removed in known manner.

A product gas becomes available in duct 40 at a rate which is lower than the rate of the synthesis gas conducted in duct 30. For this reason the cracked gas can be directly admixed to the synthesis gas flowing in the duct 30 unless a high purity is required. Otherwise it is recommendable to feed the gas from duct 40 to the absorber 19, in which $CO_2$ is removed by a treatment with methanol at low temperatures.

EXAMPLE

Granular coal having particle sizes in the range of 3 to 50 mm is fed at a rate of 378 metric tons per hour through duct 1 to the pressure gasification reactor 4. The reactor 4 is supplied with gasifying agents consisting of 139,000 m$^3$ (S.t.p.) oxygen per hour, conducted in duct 2, and of steam, which is conducted in duct 3 at the rate required for the gasification. The resulting coal gas is withdrawn through duct 8 at a temperature of about 145° C., a pressure of 35 bar and a rate of 845,000 m$^3$ (S.t.p.) of dry gas per hour and is composed of
  $CO_2$: 25.6% by volume
  CO and $H_2$: 63.5% by volume
  $CH_4$: 10.3% by volume
  $N_2$: 0.6% by volume.

When the coal gas has been cooled further, it is supplied through duct 16 to the scrubbing process, in which $H_2S$ (in the absorber 18) and $CO_2$ (in the absorber 19) are removed from the gas by scrubbing with methanol at temperatures of −30° to −50° C. according to the Rectisol process.

The purified gas which is free of $H_2S$ and $CO_2$ is withdrawn through line 20 at a rate of 630,000 m$^3$ (S.t.p.) per hour and is composed (calculated without methanol) of
  CO and $H_2$: 85.3% by volume
  $CH_4$: 13.9% by volume
  $N_2$: 0.8% by volume.

Entrained methanol is removed in the molecular sieve plant 21. The gas then flows through the heat exchanger 22 of the methanol-separating stage (units 23, 24 and 25). Three gas streams are formed in the methanol-separating stage: Pressureless synthesis gas containing $H_2$ and CO is withdrawn through duct 26 at a rate of about 10,000 m$^3$ (S.t.p.) per hour. Pressurized synthesis gas which contains $H_2$ and CO is withdrawn through duct 28 at a rate of 517,700 m$^3$ (S.t.p.) per hour. Both gas streams contain no impurities.

The methane gas fraction is withdrawn at a rate of 100,900 m$^3$ (S.t.p.) per hour through duct 27 and is composed of:
  $CH_4$: 86.2% by volume
  CO: 8.8% by volume
  $N_2$: 5.0% by volume
and is delivered to the methanol cracker 36.

The methane cracker 36 is supplied through duct with gasifying agents consisting of 69,040 m$^3$ (S.t.p.) oxygen per hour, which is delivered through duct 32, and the required steam, which is delivered through duct 33.

A gas stream at a rate of 252,400 m$^3$ (S.t.p.) per hour is withdrawn from the methane cracker 36 and is composed, on a dry basis, of
  CO and $H_2$: 94.8% by volume
  $CO_2$: 3.1% by volume
  $CH_4$: 0.1% by volume
  $N_2$: 2.1% by volume That gas stream may be supplied to the absorber 19 for a removal of $CO_2$ or may be admixed to the finished synthesis gas. In either case it is not necessary to remove $CO_2$ in the scrubber 39.

Finished synthesis gas is withdrawn through duct 30 and consists of a least 97% by volume CO and $H_2$ whereas the contents of each of the gases $CO_2$, $N_2$ and $CH_4$ is not in excess of 1% by volume.

We claim:
1. A process for producing synthesis gas having a low inert gas content and useful in the synthesis of alcohols, especially methanol and the synthesis of hydrocarbons which comprises:
  (A) gasifying coal or a heavy hydrocarbon under pressure with a gasifying agent to obtain a raw gas;
  (B) cooling the resultant raw gas to a temperature of about 20° to 50° C. in first indirect heat exchange;
  (C) removing $H_2S$ and $CO_2$ from the so-cooled raw gas by scrubbing the same with methanol at a temperature below −25° C. in a multistage scrubbing process to obtain a cold gas mixture containing CO, $H_2$ and methane;
  (D) removing methanol from said cold gas mixture by passing said mixture through a molecular sieve containing bed;

(E) cooling the gas mixture from said molecular sieve containing bed in a second indirect heat exchange to a temperature in the range of −150° to −195° C. and liquifying a portion thereof, separating the liquified portion containing methane and withdrawing a first partial stream of synthesis gas composed of CO and $H_2$, pressure relieving said first partial stream to effect a further cooling thereof;

(F) feeding said liquified portion to a distillation zone having temperatures in the upper portion of −160° to −195° C. and temperatures in the bottom portion of −120° to −170° C., said distillation zone being maintained at a pressure of 1 to 10 bar, withdrawing as an overhead product from said distillation zone a second partial stream of synthesis gas composed mainly of CO and $H_2$ with a low methane content, withdrawing a liquid methane-rich fraction from the bottom portion of said distillation zone;

(G) in said second and afterwards in said first indirect heat exchange heating said pressure relieved first partial stream of synthesis gas and said second partial stream of synthesis gas and said liquid methane-rich fraction and vaporizing said fraction;

(H) compressing said vaporized methane-rich fraction and reacting the same with steam and oxygen to produce a product rich in carbon monoxide and hydrogen, said product gas containing $CO_2$; and (I) combining at least a portion of said product gas
 (i) either with said first partial stream of synthesis gas;
 (ii) or with said raw gas from said first indirect heat exchange.

* * * * *